United States Patent [19]

Knohl

[11] Patent Number: 4,632,523

[45] Date of Patent: Dec. 30, 1986

[54] SUPPORTING SYSTEM FOR A TELESCOPE MIRROR

[75] Inventor: Ernst-Dieter Knohl, Königsbronn, Fed. Rep. of Germany

[73] Assignee: Carl-Zeiss-Stiftung, Heidenheim, Fed. Rep. of Germany

[21] Appl. No.: 802,227

[22] Filed: Nov. 26, 1985

[30] Foreign Application Priority Data

Dec. 5, 1984 [DE] Fed. Rep. of Germany ....... 3444265

[51] Int. Cl.$^4$ ............................................... G02B 5/08
[52] U.S. Cl. .................................................... 350/611
[58] Field of Search ............... 350/607, 608, 609, 611, 350/631

[56] References Cited

U.S. PATENT DOCUMENTS 3,540,802  11/1970  Tschunko ............................ 350/611
4,295,710  10/1981  Heinz ................................... 350/611
4,492,431   1/1985  Eitel et al. ............................ 350/611

*Primary Examiner*—Donald Watkins
*Attorney, Agent, or Firm*—Walter Ottesen

[57] ABSTRACT

A supporting system is disclosed for taking up the weight components of large astronomical telescopes. The weight components act in the mirror plane and load-relieving devices are arranged at the rear side of the mirror. The load-relieving devices are arranged in concentric circles and act on the outside of the rear surface of the mirror whereat supporting forces are introduced outside of the gravity plane of the mirror. Each load-relieving device applies a compensating moment to the particular portion of the mirror to which it corresponds which counteracts the disturbing moment resulting from the force of the weight of the particular portion and the supporting force.

8 Claims, 3 Drawing Figures

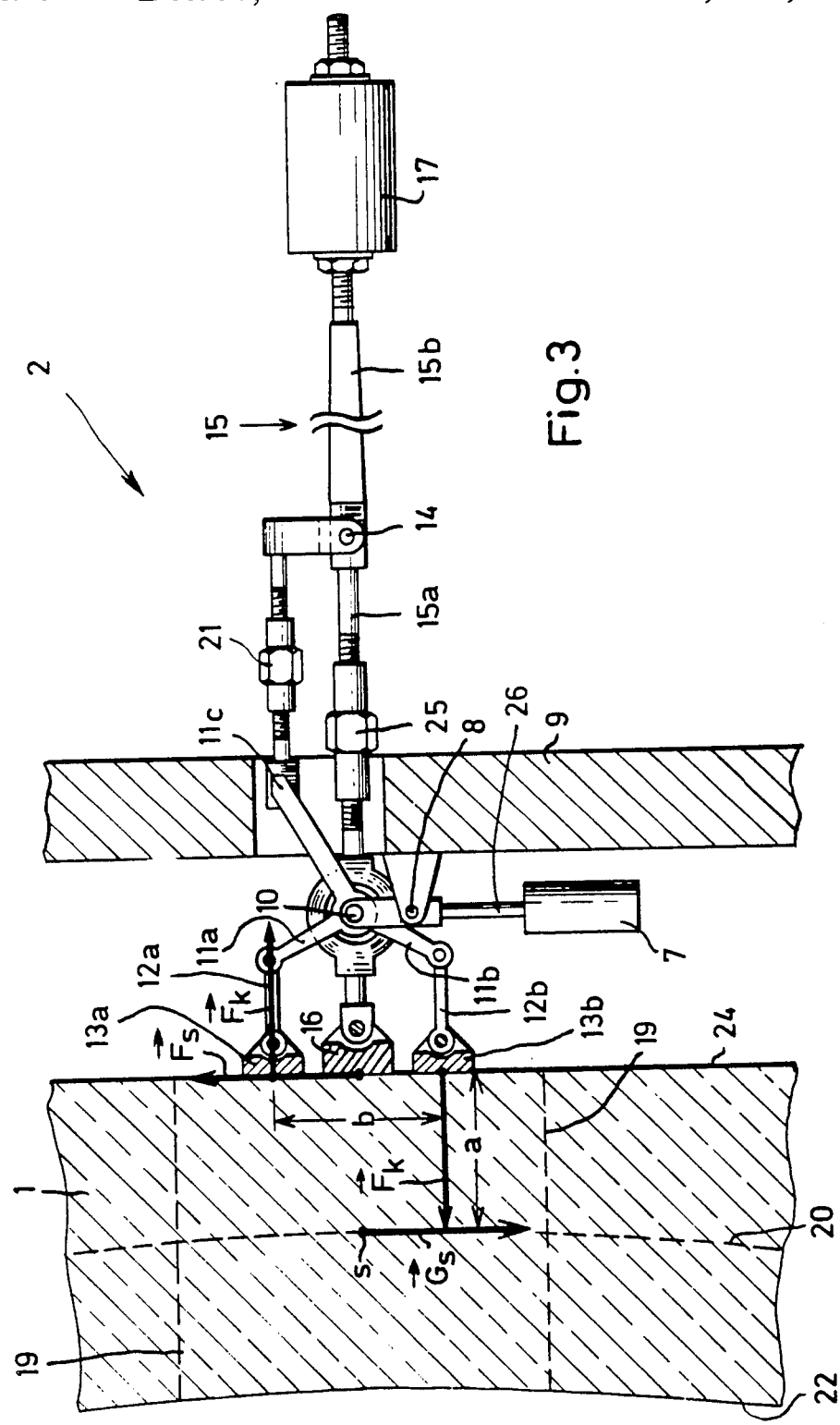

SUPPORTING SYSTEM FOR A TELESCOPE MIRROR

FIELD OF THE INVENTION

The invention relates to a supporting system for telescope mirrors having a plurality of astatic load-relieving devices which take up weight components acting in the plane of the mirror. The load-relieving devices are mounted at the rear side of the mirror and act at discrete points.

BACKGROUND OF THE INVENTION

Previously, and for larger astronomical telescopes, these forces were taken up almost exclusively by load-relieving devices which supported the mirror at its outer edge where the gravity plane of the mirror intersects the outer periphery thereof. In the following, these forces will be referred to as radial weight components.

Examples of such edge supporting systems are described in published German patent applications DE-A-33 13 324, DE-A-29 03 805 and DE-A-24 14 266.

This type of radial load relief of the body of the mirror cannot be used without more if the diameter of the mirror exceeds a predetermined amount or for so-called segment mirrors whose individual segments are to be positioned one next to the other so that no space is available at its edges for the load-relieving devices.

Further, it is known to relieve the radial weight loads by systems which engage bores on the rear side of the mirror which penetrate up to the gravity plane of the mirror. Secondary mirrors of a 3.5 m telescope such as the MPIA on Calar Alto as well as the main mirror of the 5 m telescope on Mount Palomar are journalled in this manner for example.

The last-mentioned type of radial load relief is schematically shown in FIG. 1 of the drawing of this application. In FIG. 1, reference numeral 104 designates the bores which penetrate up to the gravity plane 106 of the mirror body 101. An end of a two-arm lever 105 engages in each bore. The lever 105 is pivotably journalled about an axis 108 on the mirror frame 109 and carries a counterweight 107 at its other end.

The disadvantage of this solution is that the bores on the rear side 103 of the mirror body cause disturbances in the elastic behavior which can bring about changes in the mirror surface 102. This effect is especially noticeable in thin mirrors. It is however not possible without more to do without the bores in the mirror body and to allow the radial load relief to act on the rear side of the mirror. This is true because when the mirror body is supported outside of its gravity plane, a disturbing moment develops which likewise causes form changes of the mirror surface.

SUMMARY OF THE INVENTION

It is an object of the invention to provide an astatic supporting system arranged on the rear side of the mirror for taking up the weight components acting in the plane of the mirror and by means of which the mirror is journalled so that the least possible form changes of the mirror surface occur.

The supporting system of the invention for a telescope mirror includes a plurality of astatic load-relieving devices mounted at the rear side of the mirror and engaging the same at discrete points. The mirror is considered to be made up of portions to which respective ones of the load-relieving devices are assigned. According to a feature of the invention, the load-relieving devices engage the mirror portion on which the load is to be relieved at a location spaced from the center of gravity thereof. The load-relieving devices are each configured so that they apply a supporting force which is effective in the plane of the mirror. In addition to these forces, compensation moments are developed which oppose the moments developed by the weight forces and supporting forces.

With the load-relieving device according to the invention, bores in the rear side of the mirror are unnecessary so that the rigidity of the body remains uninfluenced. Nevertheless, the radial supporting forces effectively act in the gravity plane of the mirror because of the application of the additional compensatory moment. The position of the effective point at which the force acts can be changed by changing the magnitude of the compensating moment. It is therefore purposeful to configure the load-relieving devices so that the amount of the compensating moment can be adjustable independently of the pure supporting force in the plane of the mirror.

Furthermore, it is advantageous to place the load-relieving devices on a plurality of concentric supporting circles having respectively different diameters. The deformation vector of the mirror surface can then be adapted to the desired reference surface by varying the load factor between the load-relieving devices of the individual supporting circles.

The supporting system according to the invention is especially suited for azimuthally mounted telescope mirrors. In this case, the supporting force as well as the compensation moment can be developed by a relatively simple lever system with counterweights.

Further advantageous embodiments of the invention will become apparent from the subsequent description in conjunction with the drawing as well as from the claims.

BRIEF DESCRIPTION OF THE DRAWING

The invention will now be described with reference to the drawing wherein.

DESCRIPTION OF THE PREFERRED EMBODIMENTS OF THE INVENTION

Figure 1:
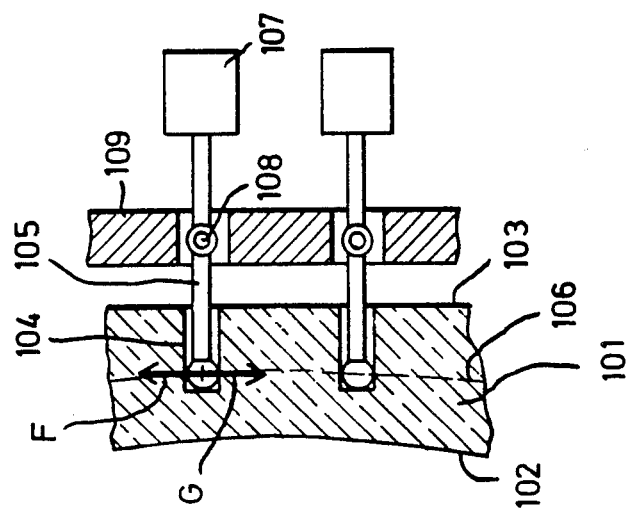
FIG. 1 is a schematic representation of a prior art weight-relieving system wherein bores are formed in the rear side of the mirror for accommdating load-relieving devices.

The prior art arrangement shown in FIG. 1 is discussed above in the introductory material covering the background of this invention.

Figure 2:
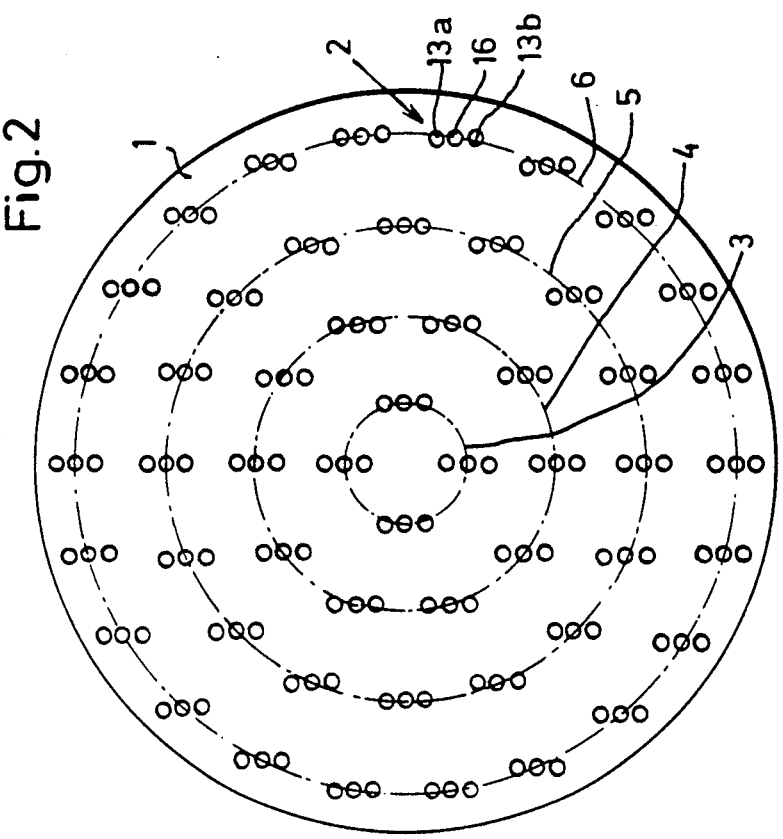
FIG. 2 is a schematic representation showing how the system of load-relieving devices of the supporting system of the invention are applied to the rear side of a telescopic mirror; and, FIG. 3 is a schematic representation, partially in section, of one of the load-relieving devices shown in an enlarged scale and for which only the points of application are shown in FIG. 2.

FIG. 2 shows the rear side of an azimuthally mounted telescope mirror. The mirror 1 is supported by the supporting system of the invention with reference to its so-called radial weight components which act in the plane of the mirror. The supporting system is made up of a plurality of individual load-relieving devices 2 which act on the rear side of the mirror 1. The load-relieving devices 2 are arranged on concentric supporting circles 3, 4, 5 and 6. Basically, the number of load-relieving devices is selected so that the local deformations and long-wave deformations remain at a minimum so that a defraction-limited imaging is assured.

As shown in the detailed schematic of FIG. 3, each of the load-relieving devices 2 comprises a lever system with a counterweight. A first two-arm lever 26 is rotatably journalled on a pivot pin 8 which is attached to a frame 9 of the telescope. The lever 26 carries a counterweight 7 at one end thereof which serves simply to take up the weight component of the actual load-relieving device attached to the other end of the lever 26; this weight component acts axially with respect to the mirror 1. The pivot pin 10 at the end of lever 26 constitutes the stationary pivot point for the load-relieving device whose function will be described below.

A further lever 11 having three arms is rotatably journalled on pin 10. The two arms 11a and 11b of this lever have the same length and are pivotally connected by respective intermediate members 12a and 12b to pull bracket 13a and push bracket 13b, respectively. The brackets 13a and 13b are glued to the rear side of the mirror 1. The lever 11 carries a pivot pin 14 at the end of the third arm 11c which defines the pivot point for a further two-armed lever 15.

The lever 15 is pivotally connected to a supporting bracket 16 which is likewise glued to the rear side of mirror 1. The lever 15 carries a counterweight 17 at its other end by means of which the supporting force $\vec{F_s}$ is developed for relieving the weight component $\vec{G_s}$ in the direction of the plane of the mirror or, more specifically, for relieving the weight component $\vec{G_s}$ for the portion 19 of the mirror 1 corresponding to the particular load-relieving device. The broken line 20 in the mirror body 1 represents the plane in which the gravity points S of the mirror portions lie which correspond to the individual load-relieving devices 2. The plane 20 is curved for most mirror forms; that is, the distance a of the plane 20 from the rear side 24 of the mirror is not constant.

Since the supporting force $\vec{F_s}$ acts on the rear side 24 of the mirror 1 while the gravity force $\vec{G_s}$ acts at the center of gravity S of the mirror portion 19, a moment $\vec{M_1}$ having a magnitude $G_s \cdot a$ occurs which can cause form changes of the mirror surface 22. This moment is compensated by the lever 11 whose arms 11a and 11b develop a countermoment $\vec{M_2} = \vec{F_k} \cdot b$ via the pull bracket and push bracket 13a and 13b.

The amount of the moment $\vec{M_2}$ can be adjusted by displacing the counterweight 17. However, the amount of the supporting force $\vec{F_s}$ also changes with this adjustment. In order to make the supporting force $\vec{F_s}$ independent of the moment $\vec{M_2}$ developed via the lever 11, the arms 11c and 15a of levers 11 and 15, respectively, can be shortened by means of respective adjusting nuts 21 and 25. Because of the relatively small spacing of pivot pin 10 from the rear side of the mirror, the shortening of lever arms 11c and 15a does not cause any significant change in the moment $\vec{M_2}$.

With the load-relieving device described above, the effective point of the application of the supporting force $F_s$ can be axially displaced toward the gravity line 20 in the mirror 1 in dependence upon the magnitude of the compensating moment $\vec{M_2}$ thereby adapting to the different spacings of the gravity line 20 from the rear side 24 of the mirror.

The embodiment of the load-relieving device of FIG. 3 is an embodiment which can be changed in many respects and still remain within the spirit of the invention. For example, it is possible to configure the pull bracket 13a, push bracket 13b and supporting bracket 16 as a single part. Furthermore, it is possible to introduce the supporting forces for the axial weight components of the mirror 1 via the lever 11. If the capability of adjusting the magnitude of the compensating moment $\vec{M_2}$ can be dispensed with, then the lever system can be of a simpler configuration. Finally, the lever system can be substituted in its entirety by a hydraulic load-relieving device which functions in a corresponding manner.

It is understood that the foregoing description is that of the preferred embodiments of the invention and that various changes and modifications may be made thereto without departing from the spirit and scope of the invention as defined in the appended claims.

What is claimed is:

1. A supporting system for a telescope mirror defining a plane, the supporting system comprising: a plurality of astatic load-relieving devices mounted at the rear side of the mirror and assigned to respective portions of the mirror for taking up the respective weight components of the mirror acting in said plane and corresponding to said portions, each of said portions having a center of gravity and each of said load-relieving devices including:
   first force transmitting means for acting on said mirror outside of said center of gravity to apply a supporting force to the mirror portion corresponding to said device so as to cause the weight component of said mirror portion and said supporting force to conjointly define a first moment; and,
   second force transmitting means for applying a compensating second moment to said mirror portion for counteracting said first moment and causing said supporting force to effectively act in said plane.

2. The supporting system of claim 1, each of said devices comprising adjustment means for adjusting the magnitude of said compensating second moment.

3. The supporting system of claim 1, said load-relieving devices being arranged in a plurality of groups assigned to respective ones of a plurality of concentric supporting circles of respectively different diameters on the rear side of the mirror.

4. The supporting system of claim 3, comprising adjustment means for adjusting the magnitude of said supporting force.

5. The supporting system of claim 4, the supporting forces applied to the mirror by the load-relieving devices of each of said groups being adjusted so as to be different for each of said groups.

6. The supporting system of claim 1, wherein the mirror is an azimuthally mounted telescope mirror.

7. The supporting system of claim 1, said first and second force tranmitting means being respective lever arrangements, the load-relieving device further comprising counterweight means associated with said lever arrangements for developing said supporting force and said compensating moment, respectively.

8. The supporting system of claim 7, comprising ancillary counterweight means for compensating for the weight of said load-relieving device.

* * * * *